UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCTION OF AMMONIUM SULFATE.

1,133,086.     Specification of Letters Patent.     Patented Mar. 23, 1915.

No Drawing.     Application filed January 21, 1913. Serial No. 743,281.

*To all whom it may concern:*

Be it known that I, CARL BOSCH, subject of the King of Prussia, residing at Ludwigshafen-on-the-Rhine, Germany, have invented new and useful Improvements in the Production of Ammonium Sulfate, of which the following is a specification.

Ammonium bisulfite can readily be obtained by simply treating aqueous ammonia solution with sulfur dioxid. It has been known since 1880 that a solution of ammonium bisulfite, when heated, in a sealed glass tube, to a temperature of about 150° C., is converted into sulfate of ammonia, sulfur and sulfuric acid (see *Berichte*, 13, 2325). No commercial manufacture of sulfate of ammonia based upon this reaction has taken place up to the present application for patent, the sulfate of ammonia of commerce being prepared by saturating dilute sulfuric acid with ammonia gas. The sulfuric acid is of course obtained from sulfur dioxid by the well known treatment in sulfuric acid chambers, or other sulfuric acid plant. The reason why sulfate of ammonia has not been commercially manufactured from ammonium bisulfite appears to be that the reaction is very liable to take place with great violence, even amounting to explosive force.

According to my invention, sulfate of ammonia is manufactured directly from sulfites of ammonia, as hereinafter explained, so as to render sulfuric acid plant unnecessary for such manufacture.

The manufacture according to this invention can be carried out by subjecting a solution of ammonium bisulfite to a local heating—that is to say, by applying heat successively to comparatively small portions of the said solution, while preventing the transference of heat from these small portions to the whole quantity of the solution in which reaction is to take place. This can be effected, for instance, by pumping a concentrated solution of ammonium bisulfite through tubes, or the like, maintained at a temperature of about 180° C. or higher, and under pressure. The conversion of the ammonium bisulfite into ammonium sulfate takes place during the passage through the tubes, or the like, sulfur separating out at the same time, so that at the end thereof the reaction is complete and ammonium sulfate in solution is obtained. It is preferred to utilize the heat of reaction by causing the heat contained in the solution leaving the apparatus to be transferred to the solution which is entering the apparatus. The process of the present invention can be carried out with comparatively small and safe apparatus and this is of great advantage, because it is often difficult to obtain large apparatus suitable for work with acid solutions under pressure.

During the treatment of ammonium bisulfite according to this invention, some sulfuric acid is formed, and it is often advantageous to carry out the reaction in the presence of ammonium sulfite, provided that the quantity taken is not too great. The proportion of ammonium sulfite which can advantageously be mixed with the ammonium bisulfite should not exceed, but should preferably be somewhat less than that represented by the following equation

$$6(NH_4)HSO_3 + 3(NH_4)_2SO_3 = 6(NH_4)_2SO_4 + 3S + 3H_2O.$$

In carrying out the above reaction, if concentrated solutions of bisulfite be employed, a part of the ammonium sulfate crystallizes out, especially if the free sulfuric acid formed in the absence of sufficient ammonium sulfite be neutralized with ammonia, and the other part of the ammonium sulfate contained in the mother liquor can be obtained by evaporation. The sulfur can be separated in any convenient manner, for instance in the liquid form from solid ammonium sulfate, or in the solid form by filtration from the ammonium sulfate solution.

Now what I claim is:—

1. The process of producing ammonium sulfate by subjecting a solution of ammonium bisulfite to local heating—that is to say, by applying heat successively to comparatively small portions of the said solution, while preventing the transference of heat from these small portions to the whole quantity of the solution in which reaction is to take place.

2. The process of producing ammonium sulfate by subjecting a solution containing ammonium bisulfite and ammonium sulfite to local heating—that is to say, by applying heat successively to comparatively small portions of the said solution, while preventing the transference of heat from these small portions to the whole quantity of the solution in which reaction is to take place.

3. The process of producing ammonium sulfate by passing a solution of ammonium bisulfite through a heated tube under pressure.

4. The process of producing ammonium sulfate by passing a solution of ammonium bisulfite through a heated tube under pressure and transferrring heat from the solution which has left the said tube to the solution which is about to enter the said tube.

5. The process of producing ammonium sulfate by passing a solution containing ammonium bisulfite and ammonium sulfite through a heated tube under pressure.

6. The process of producing ammonium sulfate by passing a solution containing ammonium bisulfite and ammonium sulfite through a heated tube under pressure and transferring heat from the solution which has left the said tube to the solution which is about to enter the said tube.

In testimony whereof I have hereunto set my hand in the presence of two subscribing witnesses.

CARL BOSCH.

Witnesses:
JOSEPH PFEIFFER,
J. ALEC. LLOYD.